United States Patent
Blankenship

(10) Patent No.: US 8,191,504 B2
(45) Date of Patent: Jun. 5, 2012

(54) COATING APPARATUS AND METHODS

(75) Inventor: Donn R. Blankenship, Southbury, CT (US)

(73) Assignee: United Technologies Corporation, Hartford, CT (US)

( * ) Notice: Subject to any disclaimer, the term of this patent is extended or adjusted under 35 U.S.C. 154(b) by 1448 days.

(21) Appl. No.: 11/604,441

(22) Filed: Nov. 27, 2006

(65) Prior Publication Data

US 2008/0187676 A1 Aug. 7, 2008

(51) Int. Cl.
*C23C 16/00* (2006.01)
*B05B 7/00* (2006.01)
*B05C 5/00* (2006.01)

(52) U.S. Cl. ............... 118/723 R; 118/300; 74/490.01; 403/52; 901/14; 901/42

(58) Field of Classification Search ............... 118/300; 74/490.01; 403/52; 901/14, 30
See application file for complete search history.

(56) References Cited

U.S. PATENT DOCUMENTS

| 4,300,362 A | 11/1981 | Lande et al. |
| 4,386,112 A | 5/1983 | Eaton et al. |
| 4,704,298 A * | 11/1987 | Herman et al. ............... 427/453 |
| 4,868,866 A * | 9/1989 | Williams, Jr. ..................... 707/9 |
| 4,976,582 A * | 12/1990 | Clavel .......................... 414/729 |
| 5,344,283 A | 9/1994 | Magowan et al. |
| 5,413,458 A | 5/1995 | Calderbank |
| 6,068,201 A * | 5/2000 | Hawley et al. .................. 239/69 |
| 7,172,385 B2 * | 2/2007 | Khajepour et al. ........... 414/735 |
| 2003/0138573 A1 * | 7/2003 | Mikhael et al. ............... 427/569 |
| 2004/0146657 A1 | 7/2004 | Heuser et al. |
| 2004/0195988 A1 * | 10/2004 | Buckingham et al. ........ 318/560 |
| 2005/0135923 A1 | 6/2005 | Coons et al. |
| 2006/0104793 A1 * | 5/2006 | Skutberg et al. ........... 414/744.6 |
| 2007/0009656 A1 * | 1/2007 | Nagase et al. ................ 427/154 |

FOREIGN PATENT DOCUMENTS

| DE | 19855175 C1 | 6/2000 |
| FR | 2545400 A | 11/1984 |
| JP | 61-65790 A | 4/1986 |
| JP | 62-127794 A | 8/1987 |
| JP | 3-52089 A | 5/1991 |
| JP | 03-161065 A | 7/1991 |
| JP | 05-038685 A | 2/1993 |
| JP | 07-116983 A | 5/1995 |
| JP | 09-314305 A | 12/1997 |

OTHER PUBLICATIONS

Machine translation: Yoneya et al., JP 09-314305, Sep. 12, 1997.*
Japanese Office action for JP Patent Application No. 2007-295059, dated Feb. 15, 2011.

* cited by examiner

*Primary Examiner* — Karla Moore
*Assistant Examiner* — Nathan K Ford
(74) *Attorney, Agent, or Firm* — Bachman & LaPointe, P.C.

(57) ABSTRACT

A coating end effector may be carried by a robot. A plasma spray head is mounted by a joint to the end effector. A plurality of actuators couple the end effector and plasma spray head to provide articulation of the joint. The apparatus may be used to coat an airfoil cluster of a gas turbine engine. The coating may include passing the head between the airfoils.

25 Claims, 7 Drawing Sheets

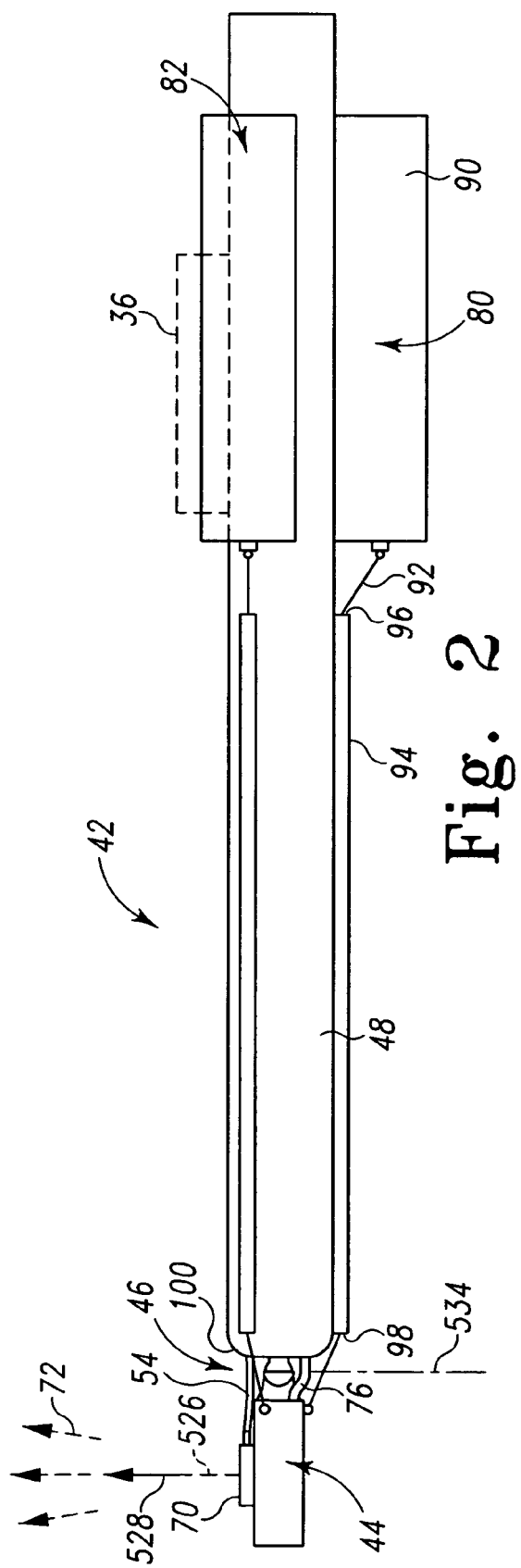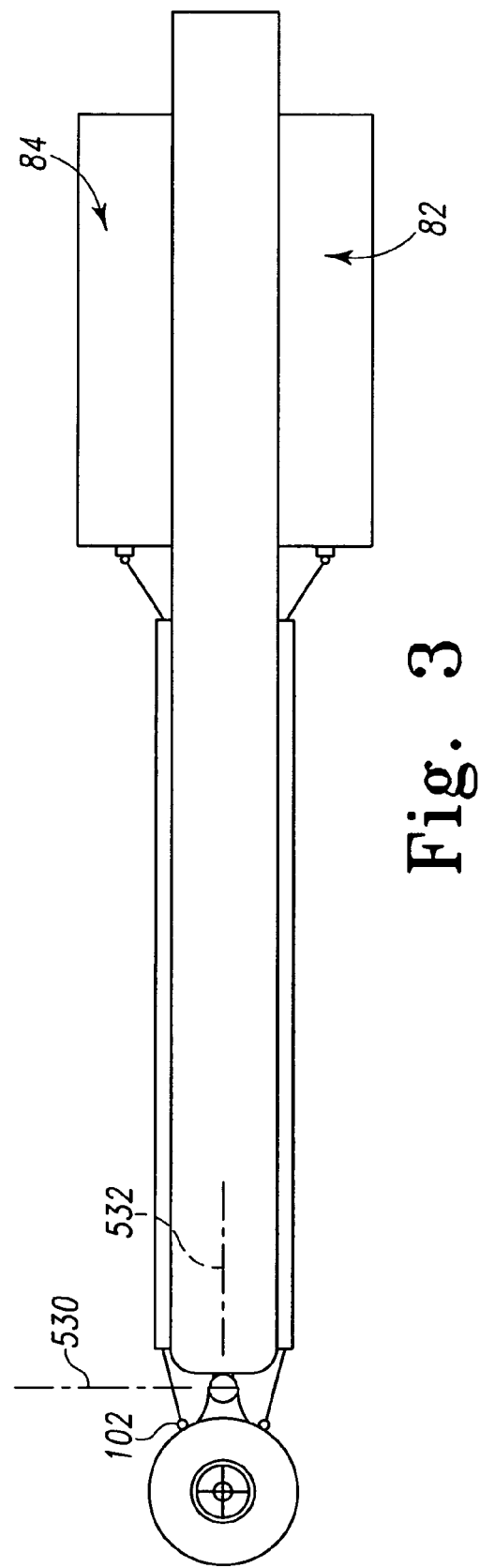

COATING APPARATUS AND METHODS

BACKGROUND OF THE INVENTION

The invention relates to coating of high temperature components. More particularly, the invention relates to coating gas turbine engine vane clusters.

In the aerospace industry, a well-developed art exists regarding the cooling of components such as gas turbine engine components. Exemplary components are gas turbine engine blades and vanes. Exemplary blades and vanes airfoils are cooled by airflow directed through the airfoil to be discharged from cooling holes in the airfoil surface. Also, there may be cooling holes along the vane shroud or vane or blade platform. The cooling mechanisms may include both direct cooling as the airflow passes through the component and film cooling after the airflow has been discharged from the component but passes downstream close to the component exterior surface.

By way of example, cooled vanes are found in U.S. Pat. Nos. 5,413,458 and 5,344,283 and U.S. Application Publication 20050135923. Vane clustering may have several advantages. The reduced engine part count may ease manufacturing and reduce weight. The reduction in the number of platform and shroud gaps (e.g., a halving with doublets) may have performance advantages. First, intergap leakage may correspondingly be reduced. Second, diversion of cooling air to cool gap seals may also be reduced.

Exemplary cooled vanes are formed by an investment casting of a high temperature alloy (e.g., nickel- or cobalt-based superalloy). The casting may be finish machined (including surface machining and drilling of holes/passageways). The casting may be coated with a thermal and/or erosion-resistant coating.

Exemplary thermal barrier coatings include two-layer thermal barrier coating systems An exemplary system includes an NiCoCrAlY bond coat (e.g., low pressure plasma sprayed (LPPS)) and a yttria-stabilized zirconia (YSZ) barrier coat (e.g., air plasma sprayed (APS) or electron beam physical vapor deposited (EBPVD)). With vane clusters (e.g., doublets), each airfoil may interfere with the line-of-sight application of the coating to the adjacent airfoil(s). This may cause local thinning of the applied coating or even gaps.

SUMMARY OF THE INVENTION

One aspect of the invention involves a coating apparatus including a robot. An end effector is carried by the robot. A plasma spray head is mounted by a joint to the end effector. A plurality of actuators couple the end effector and plasma spray head to provide articulation of the joint.

In various implementations, the articulation may be multi-axis articulation. The joint the joint may be a ball and socket joint. There may be exactly three such actuators. The actuators may be push-pull actuators. At least one of the actuators may comprise a flexible member passing through a guide on the end effector. Flexible conduits may guide powder and carrier gas flows to the plasma spray head. An electrical power line may be coupled to the plasma spray head. A controller may be programmed to operate and articulate the plasma spray head to apply a coating to a vane cluster. The controller may be programmed to operate and articulate the plasma spray head so that the plasma spray head passes between first and second airfoils of the cluster.

Another aspect of the invention involves a coating apparatus including a plasma spray head and an end effector. A joint mounts the plasma spray head to the end effector. A plurality of push-pull actuators couple the end effector and plasma spray head to provide multi-axis articulation of the joint.

In various implementations, the actuators may be positioned to provide three-axis articulation of the joint. A controller may be programmed to operate and articulate the joint to coat a vane cluster wherein the plasma spray head passes between first and second airfoils of the vane cluster. A multi-axis robot may carry the end effector.

Another aspect of the invention involves a method including coating an airfoil cluster. The cluster includes a metallic substrate having a plurality of airfoils including at least first and second airfoils, the pressure side of the first airfoil facing the suction side of the second airfoil. The coating comprises moving a robotic end effector carrying a plasma spray head. The coating further comprises articulating a joint between the end effector and the plasma spray head. The coating further includes discharging a plasma spray from the plasma spray head to coat the cluster including while the plasma spray head is between the first and second airfoils.

In various implementations, the cluster may be a vane cluster including a platform and a shroud and the plasma spray head may pass between the platform and shroud. The coating may further include directing a flow of a carrier gas to the head and directing a flow of a coating powder to the head. The articulating may include a combined pitch, roll, and yaw articulation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2 is a side view of the coating tool.

FIG. 3 is a face view of the cooling tool.

Like reference numbers and designations in the various drawings indicate like elements.

DETAILED DESCRIPTION

Figure 1:
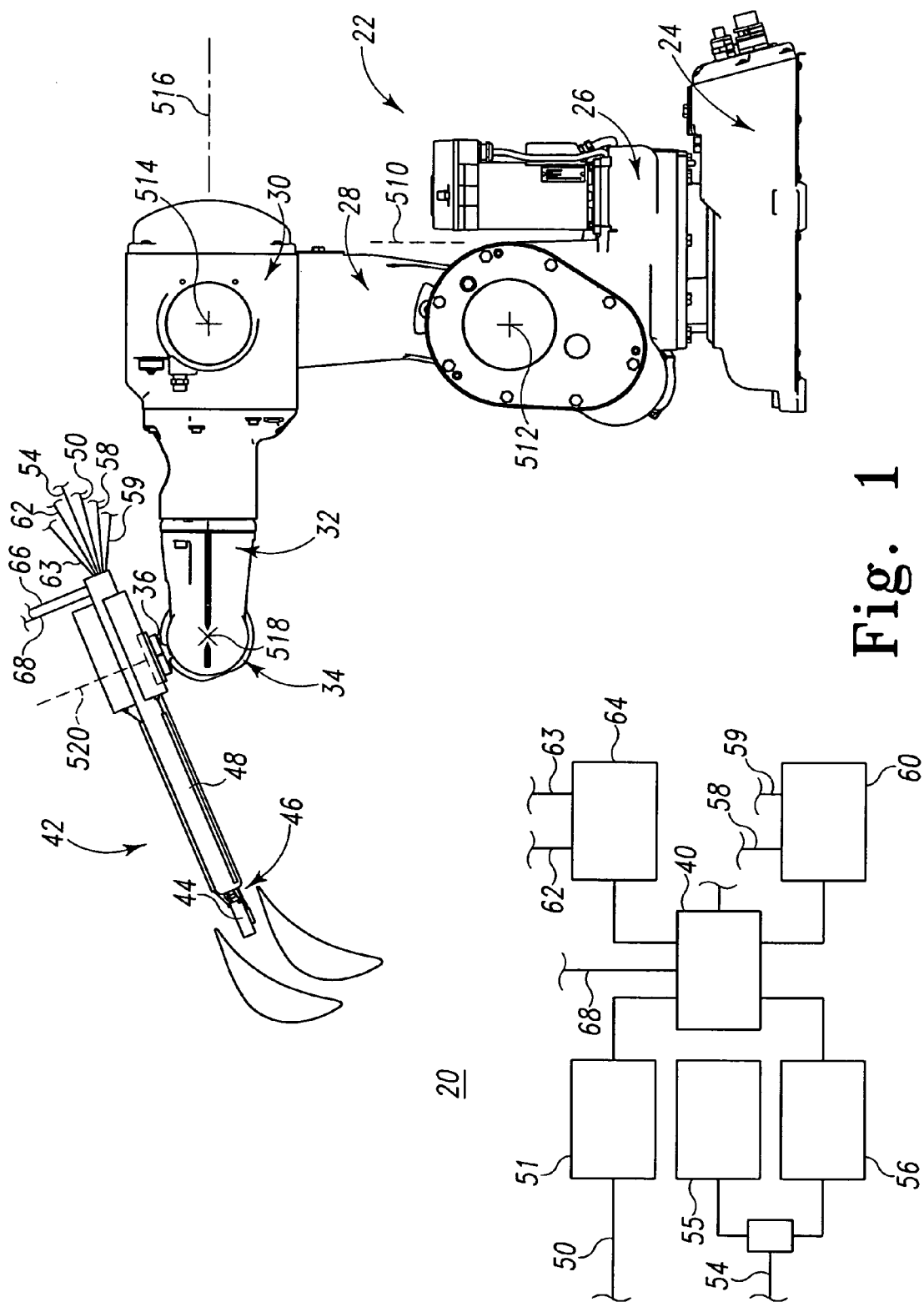
FIG. 1 is a view of a coating system including a robot bearing a coating tool.

FIG. 1 shows a coating system 20. The system 20 includes an industrial robot 22. An exemplary robot is a 6-axis robot. Exemplary robots 22 are off the shelf robots. The illustrated example is the IRB-140 from ABB Asea Brown Boveri Ltd. The exemplary robot 22 has a base 24. A first link 26 is mounted to the base for driven rotation about a vertical first axis 510. A second link 28 is mounted to the first link 26 for driven rotation about a horizontal second axis 512. A third link 30 is mounted to the second link for driven rotation about a horizontal third axis 514 parallel to the second axis 512. A fourth link 32 is mounted to the third link 30 for driven rotation about an axis 516 normal to and intersecting the third axis 514. A fifth link 34 is mounted to the fourth link 32 for driven rotation about an axis 518 normal to and intersecting the axis 516. An end/last link 36 is mounted to the fifth link 34 for driven rotation about an axis 520 normal to and intersecting the axis 518. Other robot configurations may, however, be used. The various motors for driving the rotations may be coupled to a controller 40.

The robot carries a spray apparatus 42 including a plasma spray head 44. In an exemplary implementation, the head 44 is mounted joint 46 to a distal end of an effector 48 ("end effector" broadly describing a structure mounted to/at the end of a robot). The joint 46 has one or more degrees of freedom. The end effector 48 is, in turn, mounted to the end link 36 of the robot. The end effector may be formed as a finger used to extend into spaces to be coated. The spray head 44 may be coupled to the end effector 48 for controlled articulation by means such as said joint and one or more associated actuators (discussed below). In an exemplary implementation, the joint is a ball and socket joint mounting the head to a distal end of the end effector/finger 48. Thus, the exemplary ball joint 46 provides seventh, eighth, and ninth system axes of rotation and degrees of freedom.

The spray apparatus 42 may be connected to receive various inputs. The apparatus 42 may be connected via a plasma gas conduit/line 50 to a plasma gas source 51 for receiving a plasma gas. The system 42 may be connected via a carrier gas/powder conduit/line 54 to a powder source 55 and carrier gas source 56 for receiving powder to be deposited. The system 42 may be connected via coolant supply and return conduits/lines 58 and 59 to a coolant source 60. The system 42 may be connected via a power line having conductors 62 and 63 to a power source 64 to provide power for plasma generation. Power for articulating the head may be received through one or more lines 66. Control inputs for articulating the head may be received through one or more lines 68. Although shown separately for purposes of illustration, an exemplary configuration runs the power line conductors 62 and 63 respectively within the coolant supply and return conduits/lines 58 and 59. Exemplary plasma gases consist essentially of argon/hydrogen mixtures or nitrogen/hydrogen mixtures. Exemplary coolant consists essentially of water, or other liquid. Exemplary carrier gas consists essentially of argon or nitrogen. Exemplary powders comprise the components for a YSZ barrier coat.

FIGS. 2 and 3 show further details of the exemplary spray apparatus 42. For ease of reference, the joint 46 is identified as defining a pitch axis 530, a roll axis 532, and a yaw axis 534. To articulate the head for rotation about one or more of these axes, the finger 48 carries actuators 80, 82, and 84.

The head 44 includes an outlet 70 having a central axis 526 parallel to which a discharge direction 528 is defined. In operation, the head discharges a spray 72 centered about the axis 526 and generally in the direction 528. The spray 72 may be aimed relative to the finger 48 by articulation of the head about the joint 46. An exemplary flexible jacket 76 contains the plasma gas conduit/line, coolant supply and return conduits/lines, and plasma head power line conductors to at least spanning the gap between the end effector and head.

Each exemplary actuator 80, 82, 84 includes a portion 90 fixed to the finger 48. A flexible member 92 extends from the housing 90 and may be extended and/or retracted from the housing. An exemplary actuator is a push-pull actuator in which both extension and retraction are powered. Accordingly, advantageously, the flexible member 92 has sufficient rigidity to provide push operation. The flexible member 92, however, has sufficient flexibility to move to accommodate the articulation as is discussed below. Each exemplary flexible member 92 passes through a guide tube 94 having a proximal end 96 near the housing 90 and a distal end 98 near the finger distal end 100. Respective proximal and distal portions of each flexible member 92 protrude from the respective proximal and distal ends of the associated guide tube 94. Each flexible member 92 has a distal end at an associated connection 102 to the head 44. By appropriate combinations of extensions and/or retractions of the flexible members 92, a desired combination of pitch, roll, and yaw may be achieved. Exemplary actuators are linear drives (e.g., motorized screw drives and/or solenoids). Exemplary flexible members 92 are wires. The flexible members may be flexible over just portions (e.g., near the joint) or over broader extents.

Figure 4:
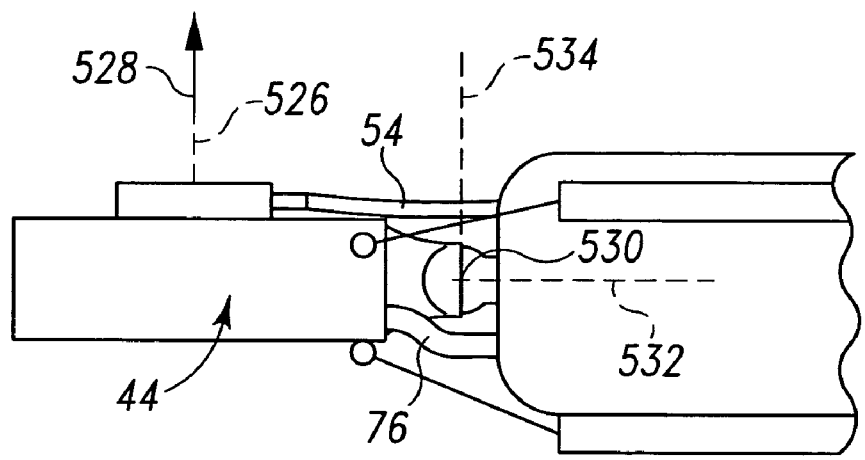
FIG. 4 is an enlarged side view of a head area of the coating tool in a neutral orientation.
Figure 5:
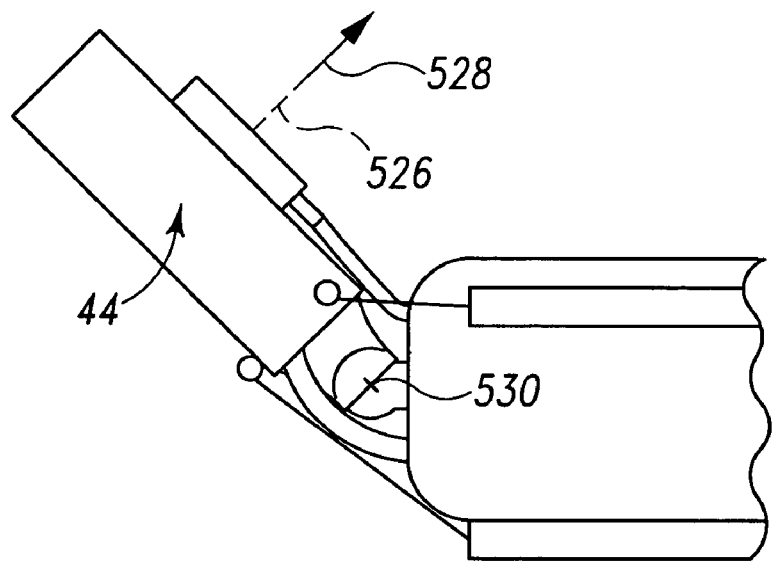
FIG. 5 is an enlarged side view of the head area in a first pitched orientation.

FIGS. 4 and 5 are side views of the head 44 in neutral and pitched-up orientations, respectively. To achieve the pitched-up orientation of FIG. 5, the flexible member 92 of the actuator 80 is extended while the flexible members 92 of the actuators 82 and 84 are retracted to rotate the head 44 about the pitch axis 530. An opposite pitched-down orientation may be achieved by retraction of the actuator 80 and extension of the actuators 82 and 84.

Figure 6:
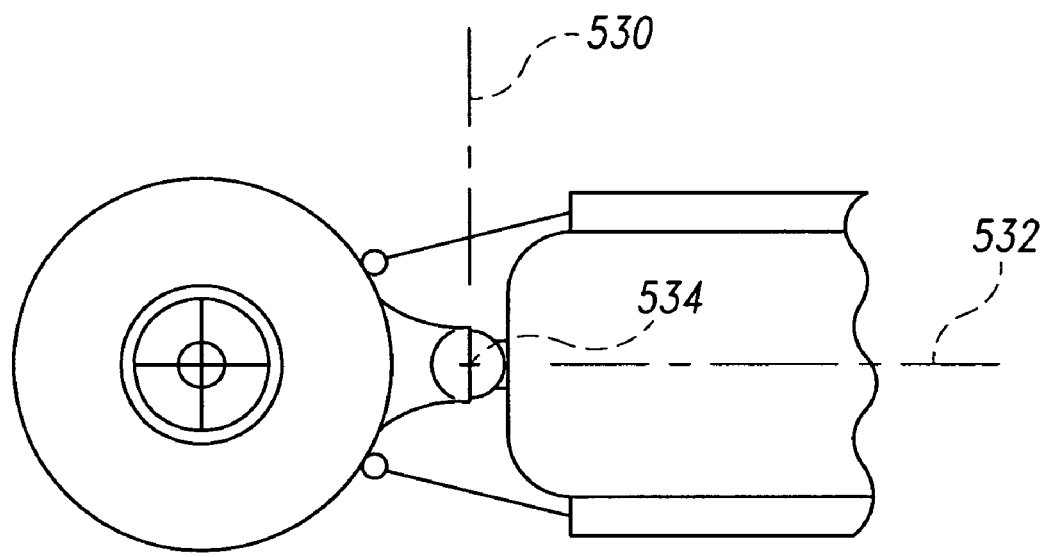
FIG. 6 is an enlarged face view of the head area in the neutral orientation.
Figure 7:
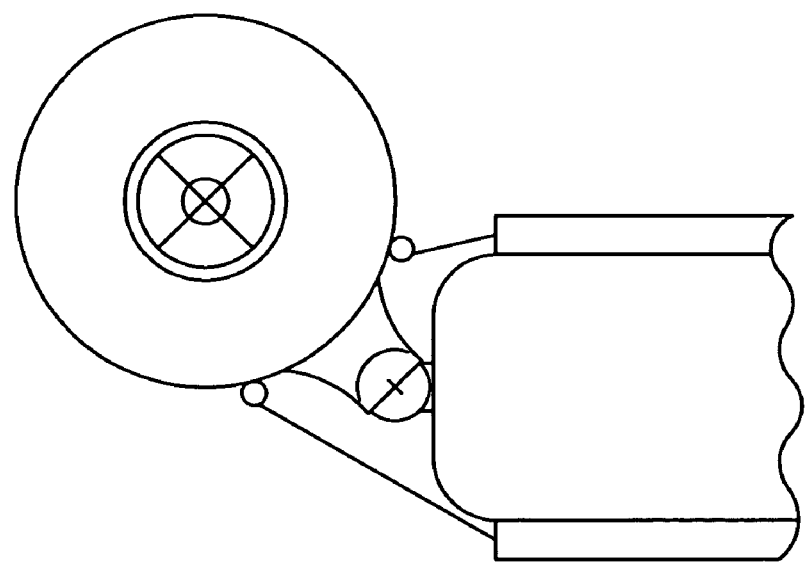
FIG. 7 is an enlarged face view of the head area in a first yawed orientation.

FIGS. 6 and 7 are respective outlet views of the head in neutral and yawed orientations, respectively. To achieve the exemplary yawed orientation of FIG. 7, the actuator 82 is extended and the actuator 84 is retracted. Geometric considerations may require the actuator 80 to be slightly extended or retracted if it is desired to maintain neutral pitch and roll.

Figure 8:
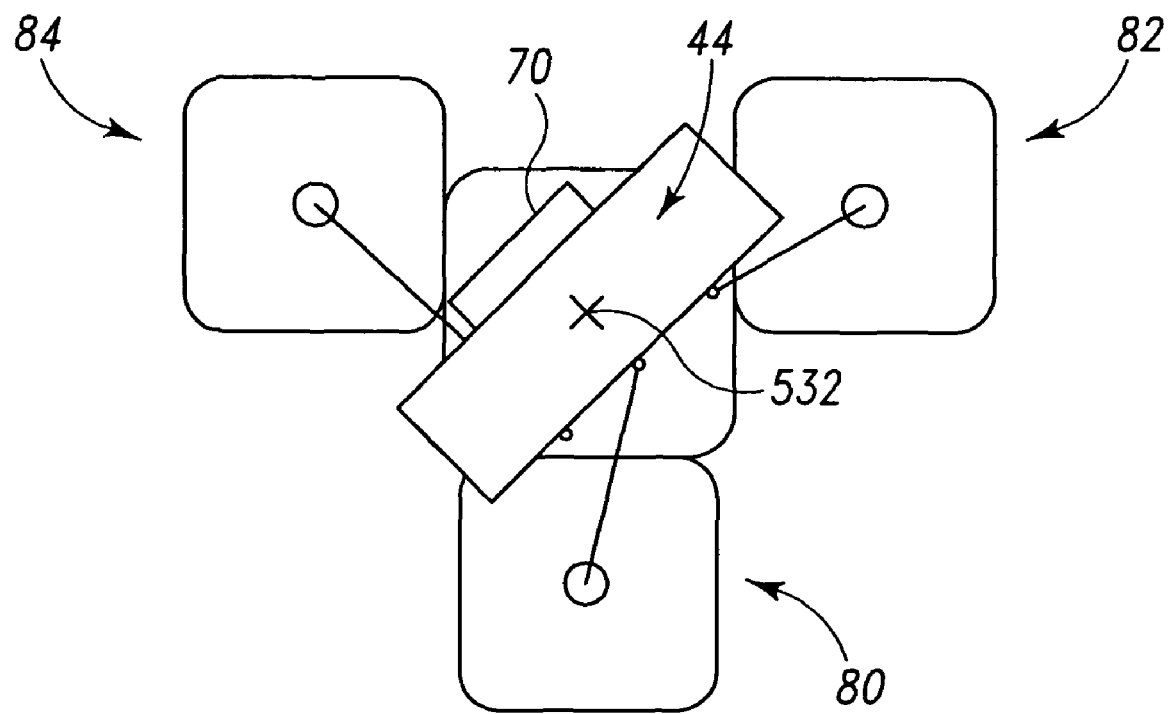
FIG. 8 is an enlarged end view of the head area in a first rolled orientation.

FIG. 8 is an end view of the head in a first rolled orientation. To achieve the exemplary rolled orientation, the actuator 82 is retracted, the actuator 84 is extended, and the actuator 80 is extended to a lesser degree so as to maintain pitch and yaw neutrality. An opposite roll may be achieved by reversing extension and retraction of the actuators 82 and 84. Via superposition of two or more of pitch, roll, and yaw movements, any desired orientation may be obtained subject to physical range of motion limits.

An exemplary use of the spray apparatus 42 is in the application of aerospace coatings. More particularly, the apparatus may be used to apply one or more layers of a multi-layer coating system. The apparatus may be used to navigate the head 44 into otherwise obstructed areas.

A noteworthy example of use of the system 20 is in applying coatings to vane clusters of gas turbine engines. Application of coatings to such components with relatively remote line-of-sight deposition systems has been limited by self-occlusion due to component geometry.

By way of background, a gas turbine engine's compressor and turbine sections may include a number of blade stages interspersed with a number of vane stages. One or more of the vane stages may be formed as a cluster ring. The ring includes an inboard platform and an outboard shroud. A circumferential array of airfoils (discussed below) span between the platform and shroud. As is discussed in further detail below, the ring may be segmented into a plurality of separately-formed clusters (e.g., interlocked at the platforms by a structural ring and at the shrouds by an engine case).

Figure 9:
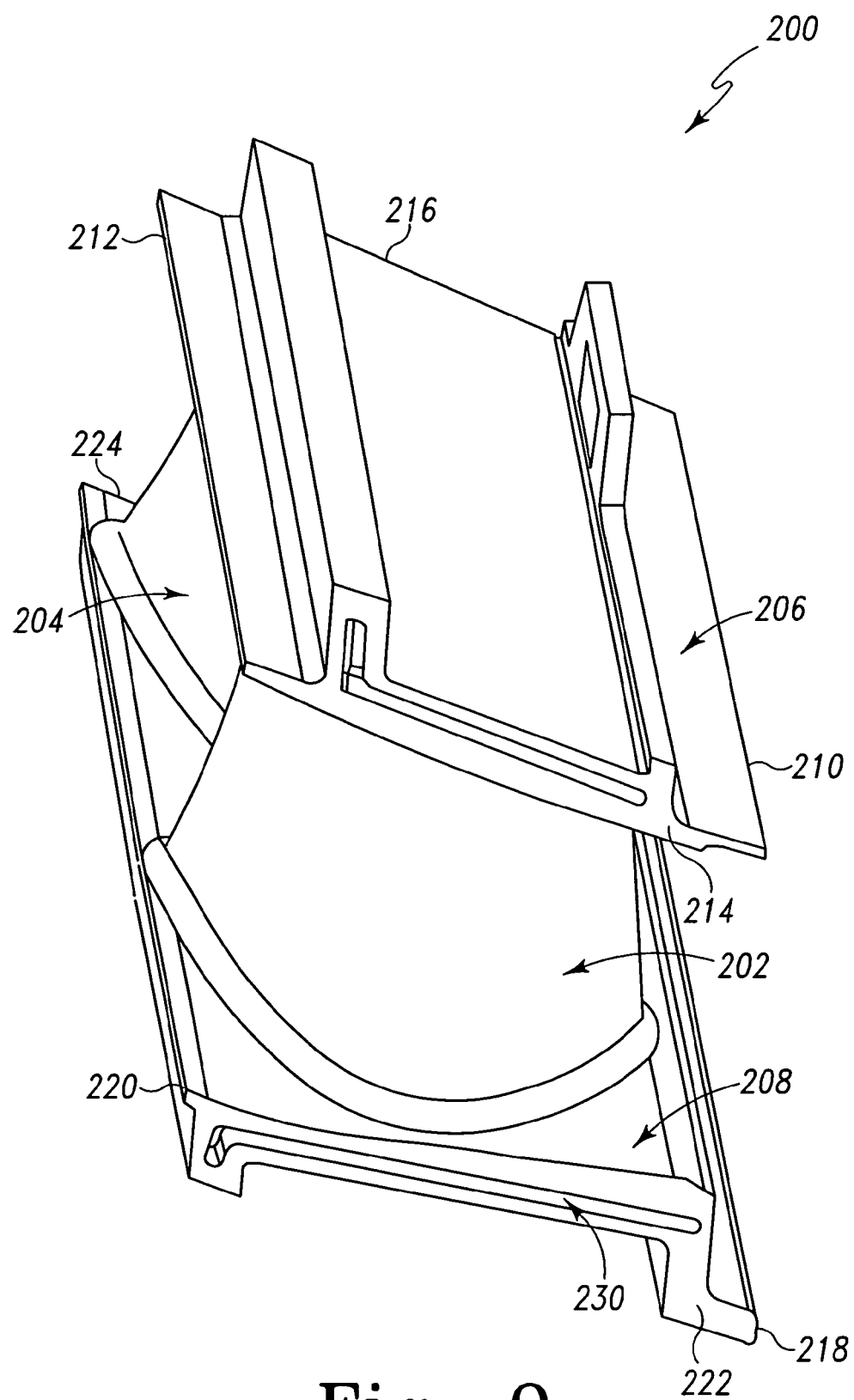
FIG. 9 is a view of a vane cluster.
Figure 10:
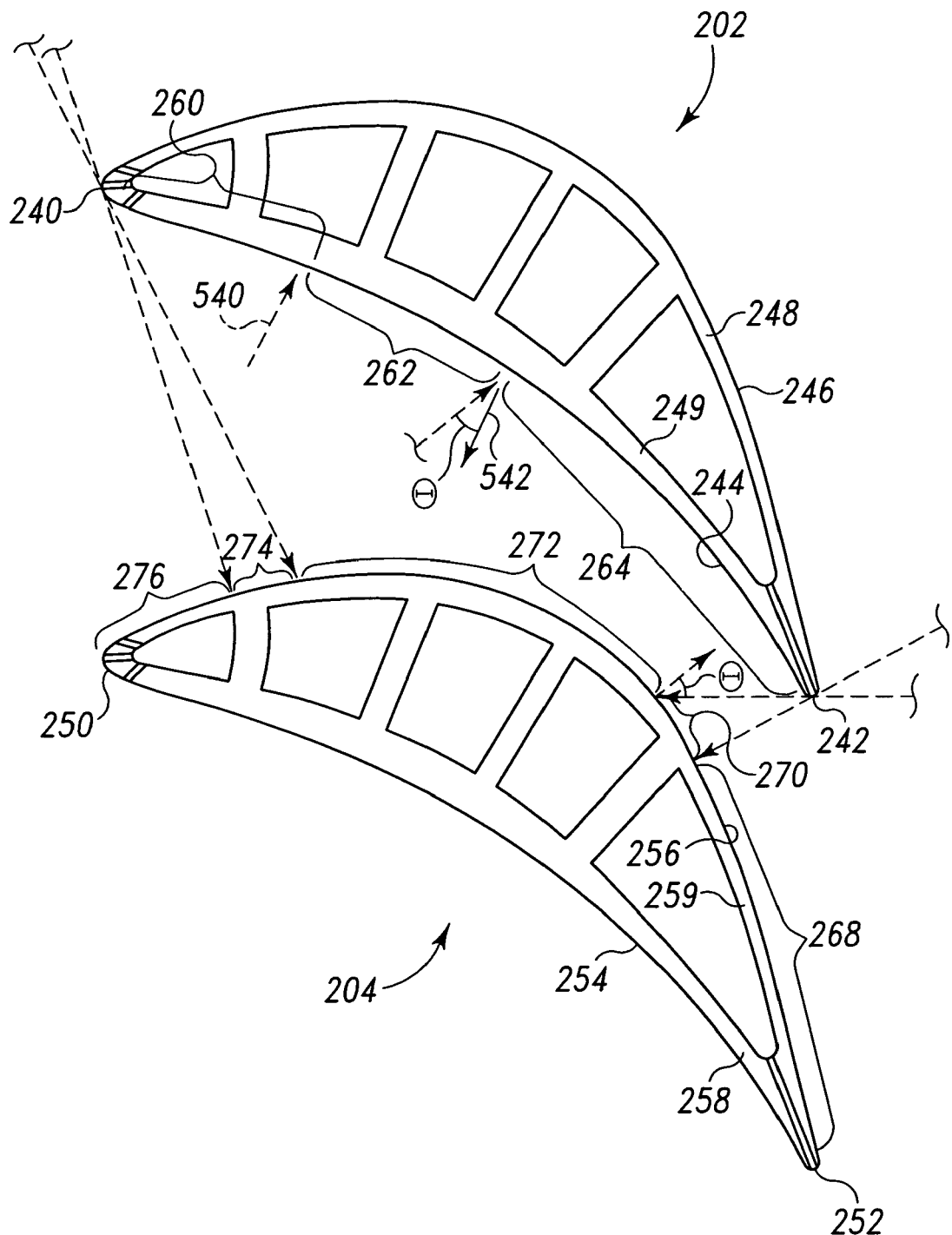
FIG. 10 is a sectional view of airfoils of the cluster of FIG. 9.

FIGS. 9 and 10 show an exemplary two-airfoil cluster (doublet) 200. Each exemplary cluster includes a first airfoil 202 and a second airfoil 204. Each of the airfoils extends from an associated inboard end at a platform segment 206 to an associated outboard end at a shroud segment 208.

An underside of the platform segment may include features for mounting each platform segment to its adjacent segments (e.g., by bolting to a ring). The platform segment has a forward/upstream end 210, a rear/downstream end 212, and first and second circumferential ends or matefaces 214 and 216.

Similarly, the shroud segment 208 has an upstream end 218, a downstream end 220, and first and second circumferential ends 222 and 224. Each of the platform circumferential ends and a shroud circumferential ends and may include a groove or channel 230 for receiving a seal (not shown). A given such seal spans the gap between the adjacent grooves of each adjacent pair of clusters.

FIG. 10 is a sectional view of the airfoils of the cluster. The first airfoil 202 is shown having a leading edge 240, a trailing edge 242, a pressure side 244, and a suction side 246. Pressure and suction side walls are shown as 248 and 249, respectively. Similarly, the second airfoil 204 has a leading edge 250, a trailing edge 252, a pressure side 254, a suction side 256, a pressure side wall 258, and a suction side wall 259. The exemplary airfoils also have internal cooling passageways.

After casting, a coating is applied along the airfoils. Exemplary coating techniques are line-of-sight spray techniques (e.g., air plasma spray (APS) and electron beam physical vapor deposition (EBPVD)). Advantageous prior art coating applications have been achieved when the spray direction is near normal to the surface being coated. For the first airfoil suction side 246 and the second airfoil pressure side 254, essentially normal line-of-sight flow access is available. However, along portions of the first airfoil pressure side 244 and second airfoil suction side 256 the other airfoil will block normal line-of-sight access. This blocking/occlusion mandates off-normal application with attendant reduction in coating thickness.

FIG. 10 shows series of line-of-sight spray directions 540 positioned at boundaries of occlusion by the airfoils. FIG. 10 also shows a local surface normal 542. Along a leading region 260 of the first airfoil pressure side, there is essentially normal or near-normal line-of-sight access. Thus, along this region 260, the coating is full thickness. Downstream thereof, the off-normal angle θ increases. There may be progressive degradation of coating thickness using prior art techniques. For example, in a region 262 to an angle θ of about 30°, the coating may be deemed marginal. In a region 264 downstream thereof, and with greater θ, the coating may be deemed poor.

Similarly, along a trailing region 268 of the second airfoil suction side 256, the coating may be full-thickness. Along a region 270 thereahead, the coating may be marginal. Along a region 272 yet thereahead, the coating may be poor. Along a region 274 yet thereahead, the coating may be marginal. Along a leading region 276, the coating may be full. The exact distribution of coating quality will be highly dependent upon the particular cluster geometry. The presence of regions of relatively thin coating may locally increase thermal damage. In addition to being affected by coating thickness, the locations of possible thermal damage are influenced by the locations of aerodynamic heating. Thus, a combination of high local aerodynamic heating and local coating thinning is disadvantageous.

In such regions, one approach to address the local thinning has been to add supplemental cooling. One possible avenue for supplemental cooling would be to add outlets from the existing passageways to the airfoil surface (e.g., film cooling holes). However, the dilution associated with such discharge of air would impact the thermodynamic performance of the engine and counter the advantage that doublets have in reduced intergap air discharge relative to singlets. Furthermore, discharge along the suction side affects aerodynamic performance of the airfoil particularly significantly, thereby impeding turbine performance.

Another approach has been to over-apply the coating. With this approach, in order to obtain a desired coating thickness on the relatively occluded regions, a more-than-desired coating thickness is applied to the other regions. This may have a number of detriments including weight, decrease aerodynamic performance, increased chances of spalling.

FIG. 1, however, shows the head 44 positioned between doublet airfoils to apply coating to an otherwise occluded region. Advantageously, articulation of the head may allow the spray to be applied relatively normal to the surface of the component.

However, merely by being able to navigate the head 44 between the airfoils and provide a relatively small application footprint, benefits can be achieved. For example, even if application in one region is substantially off-normal, an increased time exposure to that region (e.g., a decreased rate of movement during deposition) may provide a desired local coating thickness.

Use of the system 20 may thus allow greater flexibility in tailoring the coating thickness to desired amounts. The controller 40 may be programmed with an appropriate map of the component(s) to which coatings are to be applied. The map may allow the controller to traverse the head 44 over the surface of the component so as to provide desired coating thickness. In some situations, the controller may be programmed to perform a touch-up operation (e.g., after a bulk deposition which leaves thinned areas).

In an exemplary implementation, a bond coat may be deposited as described above. A primary YSZ coat may also be applied as described above, leaving the thinned areas. The system 20 then performs a pre-programmed touch-up, adding further YSZ to the thinned areas to obtain a desired thickness while leaving the remaining areas essentially unaffected.

One or more embodiments of the present invention have been described. Nevertheless, it will be understood that various modifications may be made without departing from the spirit and scope of the invention. For example, the principles may be applied in the manufacturing of a variety of components. The principles may be applied to a variety of coatings and coating technologies. The principles may be applied in the modification of a variety of existing equipment. In such situations, details of the particular components, coating materials, coating technologies, and baseline equipment may influence details of the particular implementation. Accordingly, other embodiments are within the scope of the following claims.

What is claimed is:

1. A coating apparatus comprising:
   a plasma spray head;
   an end effector;
   a multi-axis robot carrying the end effector;
   a joint mounting the plasma spray head to the end effector; and
   means for coupling the end effector and plasma spray head to provide multi-axis articulation of the joint, the means comprising:
   a plurality of push-pull actuators; and
   a plurality of guide tubes disposed on the end effector, each guide tube corresponding to one said actuator, wherein:
   each guide tube has a proximal end and distal end; and
   each actuator comprises a flexible member which passes through the corresponding guide tube from the proximal end to the distal end to be in connection with the spray head.

2. A coating apparatus comprising:
   a plasma spray head;
   an end effector;
   a multi-axis robot carrying the end effector;

a joint mounting the plasma spray head to the end effector; and three push-pull actuators coupling the end effector and plasma spray head to provide multi-axis articulation of the joint; and a plurality of guide tubes disposed on the end effector, each guide tube corresponding to one said actuator, wherein:
each guide tube has a proximal end and distal end; and
each actuator comprises a flexible member which passes through the corresponding guide tube from the proximal end to the distal end to be in connection with the spray head.

3. The apparatus of claim 2 wherein:
the actuators are positioned to provide three-axis articulation of the joint.

4. The apparatus of claim 2 further comprising:
a controller programmed to operate and articulate the joint to coat a vane cluster wherein the plasma spray head passes between first and second airfoils of the vane cluster.

5. The apparatus of claim 2 wherein:
the joint is a ball joint;
each of the three push-pull actuators comprises a flexible member; and
pitch control of the plasma spray head is provided by actuating a first of the three push-pull actuators opposite to the second and third push-pull actuators.

6. The apparatus of claim 2 wherein:
each flexible member comprises a wire.

7. A coating apparatus comprising:
a robot;
an end effector carried by the robot;
a plasma spray head;
a ball and socket joint mounting the plasma spray head to the end effector;
a plurality of actuators disposed on the end effector and coupling the end effector and plasma spray head to provide multi-axis articulation of the joint; and
a plurality of guide tubes disposed on the end effector, each guide tube corresponding to one said actuator, wherein:
each guide tube has a proximal end and distal end; and
each actuator comprises a flexible member which passes through the corresponding guide tube from the proximal end to the distal end to be in connection with the spray head.

8. The apparatus of claim 7 wherein:
the multi-axis articulation is about intersecting axes.

9. The apparatus of claim 7 wherein:
the articulation includes pitch articulation.

10. The apparatus of claim 7 wherein:
the there are exactly three said actuators.

11. The apparatus of claim 7 wherein:
the actuators are push-pull actuators.

12. The apparatus of claim 7 wherein:
the robot is a six-axis robot.

13. The apparatus of claim 7 further comprising:
a flexible conduit coupled to the plasma spray head to guide a carrier gas and powder flow to the plasma spray head;
a flexible conduit coupled to the head to guide a plasma gas flow to the plasma spray head;
a flexible conduit coupled to the head to guide a coolant flow to the plasma spray head;
a flexible conduit coupled to the head to guide the coolant flow from the plasma spray head; and
at least one electrical power line coupled to the plasma spray head.

14. The apparatus of claim 7 further comprising:
a controller programmed to operate and articulate the plasma spray head to apply a coating to a vane cluster.

15. The apparatus of claim 14 wherein:
the controller is programmed to operate and articulate the plasma spray head to so that the plasma spray head passes between first and second airfoils of the cluster.

16. A method comprising:
coating an airfoil cluster, the airfoil cluster comprising a metallic substrate including:
at least first and second airfoils, each airfoil having a pressure side and a suction side, the pressure side of the first airfoil facing the suction side of the second airfoil,
wherein the coating comprises, with the coating appratus of claim 1:
moving the end effector;
using the plurality of actuators to articulate the joint; and
discharging a plasma spray from the plasma spray head to coat the cluster, including while the plasma spray head is between the first and second airfoils.

17. The method of claim 16 wherein:
the cluster is a vane cluster having:
a platform;
a shroud; and
at least said first and second airfoils extending between an outer face of the platform and an inner face of the shroud; and
the articulating moves the plasma spray head between the platform and shroud.

18. The method of claim 17 wherein:
the articulating comprises combined pitch, roll, and yaw.

19. The method of claim 16 wherein:
the articulating comprises a pitch articulation.

20. The method of claim 16 wherein:
the articulating comprises a combined at least two of pitch, roll, and yaw.

21. The method of claim 16 further comprising:
separately directing flows of a carrier gas and a powder coating material to the plasma spray head.

22. The apparatus of claim 7 wherein:
the actuators comprise three push-pull actuators.

23. The apparatus of claim 7 wherein:
the actuators comprise a first actuator, a second actuator, and a third actuator; and
pitch is controlled by actuating the first actuator differently from the second and third actuators.

24. The apparatus of claim 7 wherein:
the first actuator is centrally coupled to the head and the second and third actuators are coupled at opposite sides of the head.

25. The apparatus of claim 7 wherein:
said flexible member consists over at least a portion of said flexible member, of a flexible material.

* * * * *